Oct. 18, 1955  A. L. JONES  2,720,979
THERMAL DIFFUSION APPARATUS AND METHOD
Filed April 5, 1954
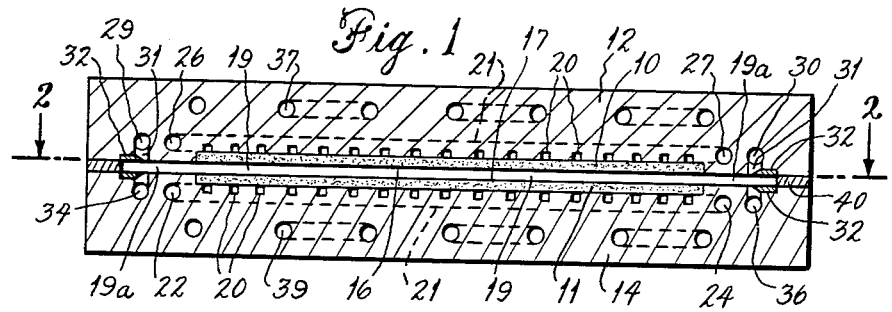
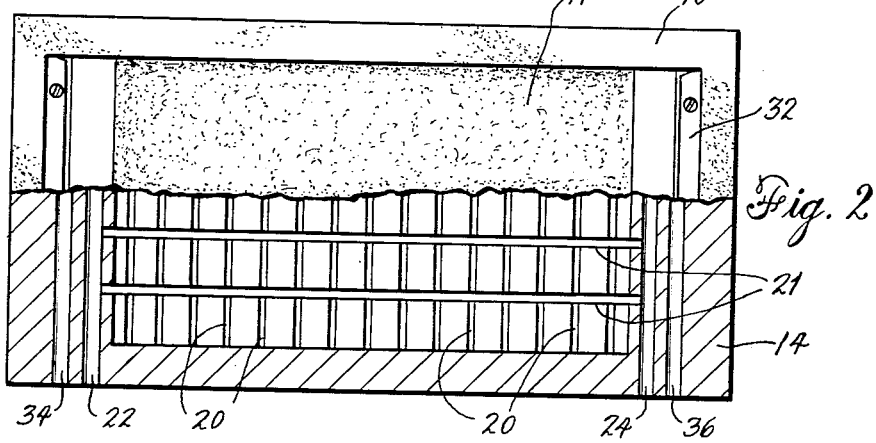
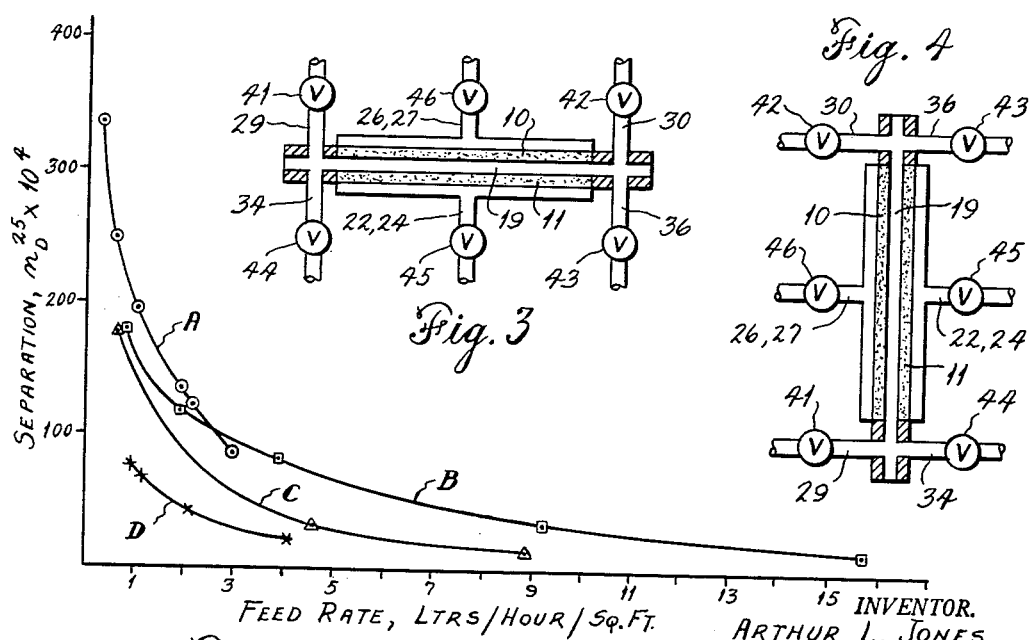
INVENTOR.
ARTHUR L. JONES
BY
Campbell, Brumbaugh, Free & Graves
ATTORNEYS United States Patent Office 2,720,979
Patented Oct. 18, 1955

2,720,979

THERMAL DIFFUSION APPARATUS AND METHOD

Arthur Letcher Jones, Lyndhurst, Ohio, assignor to The Standard Oil Company, Cleveland, Ohio, a corporation of Ohio Application April 5, 1954, Serial No. 420,808

15 Claims. (Cl. 210—52.5)

The present invention relates to improvements in apparatus for separating dissimilar materials in a liquid mixture by liquid thermal diffusion and to an improved liquid thermal diffusion process.

The art of separating liquid mixtures into two or more liquid fractions, e. g., a first fraction enriched in one component of the liquid mixture and a second fraction impoverished in said component or enriched in another, by imposing a temperature gradient across a thin layer or stream of the mixture, dates back almost one hundred years but remained largely a laboratory curiosity because of the extremely poor separations obtained. In recent years, however, interest has been revived in liquid thermal diffusion as a means of resolving a liquid mixture into two or more dissimilar fractions that are relatively enriched and impoverished in components that are extremely difficult, if not impossible, to separate by other means and to carry out such separations on a commercially feasible scale.

Liquid thermal diffusion is carried out in apparatus consisting essentially of two closely spaced walls defining a separation chamber. One of the opposed, chamber-forming walls is maintained at a temperature higher than the other in order to impose a temperature gradient across the liquid in the separation chamber. It is believed that energy of translation is imparted to the molecules in the liquid from the wall which is at the higher temperature, referred to herein as the "hot wall" or "relatively hot wall", and that this energy is reflected in a tendency of the molecules to move toward the opposite "cold wall" or "relatively cold wall." It is also believed that the tendency of different molecules in a liquid mixture to move toward opposite walls is dependent upon their difference in shape. If there is no difference in shape, then molecular weight is believed to be controlling. It has been observed, for example, that in the separation of compounds of approximately equal molecular weight, the more compact molecules such as those of the ring type, tend to move more readily from adjacent the hot wall toward the cold wall than do molecules of extended configuration, such as long chain aliphatics. On the basis of these and other observations, it is concluded that the imposition of a thermal gradient across a liquid mixture in a thermal diffusion separation chamber rapidly resolves the mixture, at least initially, into one having, as to a particular component, a concentration gradient across the thin layer or stream. Thus, for example, a thin layer or stream of a liquid mixture composed of, or containing, components A and B is rapidly stratified or resolved into an exterior or face stratum immediately adjacent the hot wall which has a maximum concentration of component A and a minimum concentration of component B, another exterior or face stratum immediately adjacent the opposite cold wall and having a maximum concentration of component B and a minimum concentration of component A, and one or more intermediate strata wherein the concentrations of component A become smaller as the distance from the hot wall increases, and vice versa. The exterior or face strata, i. e., the portions of the liquid immediately adjacent the hot and cold walls, are most dissimilar from one another in that they contain the highest concentrations of the separated materials.

Various proposals have heretofore been made for removing the separated materials that initially accumulate immediately adjacent the hot and cold walls. These proposals include moving the walls of the apparatus as well as moving the liquid material in the separation chamber between the walls and all involve a relative endwise, as distinguished from lateral, movement of the fractions or strata accumulated immediately adjacent the walls until they are withdrawn from the apparatus through appropriate outlets at one or both ends. For continuous thermal diffusion operations, the proposals for moving the liquid through the chamber rather than moving the walls have been considered most practicable and various end withdrawal flow patterns, primarily classifiable as concurrent or countercurrent and as horizontal or vertical, have been suggested for the purpose of facilitating and enhancing the actual withdrawal of the fractions separated within the apparatus. A concurrent flow pattern, which may be horizontal or vertical, is one in which the various strata of liquid mixture move endwise of the chamber in a given direction from the point of entry into the separation chamber to the points of withdrawal therefrom of the fractions separated. A countercurrent flow pattern, which may likewise be horizontal or vertical but is most often vertical, is one in which the flow of liquid adjacent one chamber-forming wall is in a direction opposite to that of the flow of liquid adjacent the other wall, both directions of flow being endwise of the chamber, and the points of withdrawal of the fractions are at opposite ends of the chamber. In static operations, i. e., those in which the separation chamber is filled with liquid mixture that is subjected to a temperature gradient for a preselected length of time, during which no liquid is introduced or withdrawn, the chamber may be vertical or horizontal and the different fractions may be withdrawn at the same or opposite ends.

These methods have in common the feature that the liquid mixture subjected to thermal diffusion in essence becomes divided into strata moving endwise, as distinguished from laterally, through the chamber, said streams being withdrawn at one end or opposite ends of the separation chamber through outlets that normally are remote from the inlet. All of the material in a given fraction must move endwise along at least half the length of the chamber before it is withdrawn. However, since the exterior or face stratum of liquid immediately adjacent one wall or the other moves much more slowly, due to surface friction, than intermediate strata that are more nearly midway between the chamber-forming walls, and such exterior stratum inherently possesses the highest concentration of one or the other desired dissimilar materials, it is apparent that a fraction as withdrawn from such apparatus is not truly representative of the separation actually obtained within the chamber because the material concentrated to a high degree in the slowly moving exterior or face stratum immediately adjacent the chamber-forming wall is in effect diluted by the more rapidly advancing and less concentrated material in the inner strata of the stream.

The present invention is based on a conclusion that in order effectively to take advantage of the high degree of separation actually achieved rapidly within a thermal diffusion separation chamber, the most concentrated portion of at least one of the dissimilar fractions should be removed with a minimum of dilution by liquid that has been resolved less completely into dissimilar components. Removal of the concentrated portion or portions of the liquids is best accomplished by withdrawing the liquid substantially simultaneously and uniformly from all parts of the major portion of the surface of the strata or stratum in contact with one or both of the hot and cold walls of the separation chamber.

Generally, in the apparatus of the invention, the separation chamber is formed by wall members positioned face to face, at least one of said wall members being porous or liquid-permeable. The opposed faces of the wall members are smooth and substantially equidistantly spaced apart and means are provided for relatively heating one of the wall members and cooling the other wall member for maintaining a temperature gradient across the separation chamber and any liquid mixture within the separation chamber. The wall members may be of any desired shape, i. e., rectangular, circular or the like. Conduit means are provided for introducing liquid into or withdrawing one or more liquid fractions from the separation chamber directly, i. e., endwise or radially and not through a porous wall member, and other conduit means are provided, behind at least one porous wall member, for collecting and withdrawing one or more liquid fractions from, or distributing and introducing liquid mixture into the separation chamber through one or more porous wall members.

In a preferred embodiment of the apparatus, the wall members on both sides of the separation chamber are porous, a plurality of outlets are provided behind each porous wall member for collecting and withdrawing in a lateral direction, as distinguished from endwise or radial directions, the fraction that accumulates in its most highly concentrated form in the outer or face stratum immediately adjacent the chamber-forming face of the wall member, and one or more inlets, communicating directly with the separation chamber, are provided for introducing a liquid mixture for separation into dissimilar fractions by thermal diffusion.

It has been found that the rapidity and degree of separation of dissimilar components in a given liquid mixture are, with continuous, concurrent flow patterns as distinguished from continuous, countercurrent flow patterns and static operations, substantialy independent of the spacing, per se, between the chamber-forming walls of the separation chamber. The rate and degree of separation in continuous, concurrent flow patterns are, however, proportional to the temperature gradient, i. e., the difference between the hot and cold wall temperatures divided by the spacing between the separation chamber-forming walls. Thus, for example, if the spacing is halved, the rate and degree of separation will remain the same if the temperature difference is likewise halved. If the temperature difference remains the same and the spacing is halved, the rate or the degree of separation will be doubled. Inasmuch as the maximum temperature of the hot wall is limited to the lowest boiling or decomposition temperature of the liquid mixture or any of its components under the conditions of operation and since the minimum temperature of the cold wall is limited by the highest freezing temperature of the liquid or any of its components, it is preferable, in order to impose a high temperature gradient across the mixture, to make the spacing between the chamber-forming walls as small as possible. While separations are obtainable in continuous, concurrent flow methods when the spacing between the chamber-forming walls is as great as about 0.5 inch, it is generally desirable, and in fact required in continuous countercurrent methods and in static methods in which countercurrent thermal circulation takes place, that the spacing be considerably smaller, i. e., of the order of about 0.15 inch or less, and preferably less than about 0.08 inch. Continuous, horizontal concurrent flow patterns are preferred.

The method of the present invention differs considerably from methods heretofore proposed. In the heretofore suggested methods, the molecules A and B in effect become aligned into a series of columns or strata moving endwise at different speeds through the chamber and, when withdrawn at the end of the separation chamber, in effect perform movements similar to the "column right" and "column left" movements of soldiers on a drill field. In the method of the present invention, however, the dissimilar molecules need not advance to the end of the separation chamber but, as soon as they are lined up in a column adjacent one of the chamber-forming walls, they in effect go through a flanking or lateral movement through the immediately adjacent porous wall. In this manner only the most concentrated portions of the mixture in the separation chamber are withdrawn and there is no problem of dilution thereof by the portions of the liquid intermediate the chamber-forming walls.

The chamber-forming wall members in the apparatus of this invention should be porous to liquid over at least a substantial portion, as distinguished from a small fraction less than about one-fourth, the area of the separation chamber. It is preferred that a major portion of the area of the walls forming the chamber be porous, and optimum results are obtainable when the chamber-forming walls are porous over substantially the entire area of the chamber. It is to be understood that considerable latitude is permissible in determining the total area of a chamber-forming wall which is to be porous as well as in determining what portions thereof are to be porous. Thus, for example, a chamber-forming wall may have a plurality of porous areas separated by non-porous areas having heating or cooling means imbedded therein.

It should also be understood that the efficiency of separations by the method and apparatus of the invention will depend in large part upon the actual temperatures at the opposed surfaces of the hot and cold chamber-forming walls, all other conditions being equal. Consequently, constructions are preferred which contribute to maximum heat conductivity between said wall surfaces and the means provided to relatively heat or cool them. One such contributing factor is a substantially uniform and small pore size in the porous wall member or the porous portions of the chamber-forming walls. Another factor is high heat conductivity of the material of which the wall or wall member is constructed, metals being preferred for this reason. If the porous portion or portions of the wall members are supported by means for relatively heating or cooling them, as more fully described hereinafter, it is preferred that such portions be fixed securely to the support for maximum heat conductivity, e. g., by soldering, welding, or the like.

Uniformity and smallness of pore size, besides contributing to good heat conductivity, is also preferred from the point of view of minimizing turbulence in the separation chamber and promoting uniform withdrawal of the outer face strata of liquid in the chamber. It is to be understood, of course, that the chamber-forming walls as well as the porous portions thereof should be of a material that is inert to the liquid mixtures and its components under the conditions of operation and that departures from the preferred construction of the apparatus with reference to pore size and uniformity, heat conductivity, inertness, and the like, would reduce the efficiency of the apparatus and, if carried too far, render it inoperable.

The method of the present invention is adaptable to flow patterns and static operations in which the separation chamber may be horizontal or vertical as well as to methods, such as described in application Serial No. 218,944 of Jones and Milberger, filed April 3, 1951, involving the use of a liquid-permeable membrane parallel to and supported between the chamber-forming walls. The method is preferably applied to continuous, horizontal and concurrent flow patterns.

The primary advantage of the apparatus and method of the invention is that it takes cognizance of the hitherto unappreciated rapidity with which separation by thermal diffusion actually takes place within a thermal diffusion chamber in that the outer strata of the liquid stream are continually removed from the stream as rapidly as they are formed and without requiring any portion of the liquid to move along the length of a separation chamber in a plane closely adjacent one wall or the other of the separation chamber and without being diluted with less concentrated portions of the liquid.

This and other advantages, as well as the utility of the invention, will be further described with reference to the accompanying drawing, wherein:

Figure 1 is a sectional view in elevation through one preferred embodiment of the apparatus;

Figure 2 is a plan view, partly broken away, taken on section line 2—2 of Figure 1;

Figure 3 is a schematic view of the apparatus embodiment illustrated in Figures 1 and 2;

Figure 4 is a schematic view of the same apparatus disposed in a vertical position; and Figure 5 is a graph comparing the results obtainable by use of the preferred flow pattern of the invention with those obtained by horizontal concurrent and vertical countercurrent end withdrawal flow patterns.

The apparatus illustrated in Figures 1 and 2 consists essentially of two porous, substantially horizontal, wall members 10 and 11 positioned face to face and supported in recesses of corresponding dimensions in plate members 12 and 14. The opposed faces 16 and 17 of the wall members 10 and 11, respectively, are smooth and substantially equidistantly spaced from one another to form a substantially uniformly narrow separation chamber 19. The base of the recess in the plate member 14 is provided with a plurality of shallow transverse grooves 20 communicating with several longitudinal grooves 21 which in turn communicate at each end with conduits 22 and 24, as shown best in Figure 2. The base of the recess in the plate member 12 is similarly provided with a plurality of transverse grooves 20, several longitudinal grooves 21 and with conduits 26 and 27.

The plate member 12 is provided with conduits 29 and 30 communicating directly with the separation chamber 19 by any suitable flow equalizing means such as grooves 31 provided with knife-edge blades 32, as described in application Serial No. 273,737 of Jones, Seelbach and Frazier, filed February 27, 1952. The plate member 14 is shown as similarly provided with conduits 34 and 36.

The plate members 12 and 14 are further provided with any suitable means, indicated schematically by reference numerals 37 and 39, for relatively heating the porous wall member 10 and relatively cooling the porous wall member 11. Thus, for example, the means 37 in plate member 12 may comprise cartridge-type heaters inserted into extended holes and the means 39 may comprise a set of coils imbedded in the plate member 14 through which a cooling medium is passed.

The porous wall members 10 and 11, are secured, preferably by soldering in place around the edges, in the recesses of the plate members 12 and 14 in a manner to insure maximum thermal conductivity between each wall member and its supporting plate member. A gasket 40 is provided between the plate members 12 and 14 to space the opposed faces 16 and 17 of the porous wall members 10 and 11 apart, seal the separation chamber 19 against leakage and insulate the relatively hot and cold plate members 12 and 14 from one another.

It is to be understood, of course, that it is unnecessary to have four separate conduits 29, 30, 34, and 36 communicating directly with the separation chamber 19. For the purpose of facilitating a description of the various flow patterns within the scope of the method of the invention, these four conduits are shown, in Figures 3 and 4, as provided with valves 41, 42, 43 and 44, respectively. In addition, the conduits 22 and 24 of Figure 1 are represented as a common conduit 22, 24 provided with a valve 45, and conduits 26 and 27 of Figure 1 are represented as a common conduit 26, 27 provided with a valve 46.

The liquid mixture subjected to thermal diffusion may be introduced into the separation chamber 19 between the porous wall members 10 and 11 through one or more of the inlets 29, 30, 34 and 36 at one or both ends of the chamber. Thus, for example, the liquid mixture may be introduced by way of conduits 29 or 34, groove 31, knife-edge 32, and the narrow space 19a between the plate members 12 and 14 and between the gasket 40 and the ends of the porous wall members 10 and 11, the conduits 30 and 36 at the other end of the apparatus being closed by valves 42 and 43, or the liquid mixture may be introduced into the separation chamber at both ends. As the liquid mixture advances through the chamber 19 from one or both ends thereof, one of the dissimilar components rapidly becomes concentrated immediately adjacent one of the faces 16 and 17 of the porous wall members 10 and 11 and, if there are two dissimilar components, the other rapidly becomes concentrated immediately adjacent the face of the other porous wall, whence the dissimilar components are immediately withdrawn over the entire area of each of the porous walls 10 and 11 into the transverse grooves 20, the longitudinal grooves 21 and finally into the outlet conduits 22, 24, 26 and 27.

It is apparent from this description of the method of the invention and the operation of the apparatus that the liquid mixture in the separation chamber 19 is rapidly resolved into a number of strata of which the two exterior face strata represent the most dissimilar fractions. These strata then in effect seep out, i. e., are removed laterally, through the porous walls, rather than flow along the relatively hot and cold walls as heretofore proposed, with the result that only the most concentrated portions of the separated fractions are withdrawn. It will further be apparent that in view of the relatively large area over which withdrawal is effected, the velocity of withdrawal is extremely small with the desirable result that turbulence and dilution by admixing are completely avoided.

Referring now specifically to Figures 3 and 4, it will be apparent that it is also within the scope of the invention to close valve 45 or valve 46, thus effectively cancelling out the porosity of one wall member or the other, or to accomplish the same result by replacing one of the porous wall members 10 or 11 by a liquid-impervious wall member. Thus, for example, the liquid mixture may be introduced by way of conduit 29 or 34 or both, one fraction may be withdrawn through a porous wall member by way of conduit 22, 24 or conduit 26, 27 and the other fraction may be withdrawn by way of conduit 30 or 36. Such an embodiment may be particularly desirable in instances in which the desideratum is to concentrate one component that is present in the liquid mixture in only small amounts and there is no interest in recovering any material in the balance of the liquid mixture. Separations of this type may be made still more effective by making the withdrawal rates of fractions unequal, the rate of withdrawal of the fraction containing the desired concentrated component being appreciably reduced as compared with the rate of withdrawal of the other fraction.

It is also within the scope of the invention to operate the apparatus, shown in the horizontal position in Figure 3, in the vertical position shown in Figure 4, or in any intermediate inclined position, so long as the cold wall is not above the hot wall. It is preferred, when operating in the vertical position, to make the rate of feed and the rates of withdrawal sufficiently high to overcome a tendency to establish thermal convective (countercurrent) circulation within the chamber and thus bring about a continuous, vertical, concurrent flow pattern. In instances where the dissimilar fractions are withdrawn through both the hot and cold porous wall members, the liquid mixture may be introduced at one or both ends of the chamber and, if the liquid mixture is introduced at one end only of the chamber, dissimilar fractions may be withdrawn through the porous wall members 10 and 11 at relatively low, equal or unequal, rates and the remainder may be withdrawn at a relatively high rate from the other end of the chamber.

To further illustrate the advantages of the preferred embodiment of the present invention, a number of comparative tests were carried out. In the first two tests the apparatus used was substantially as shown in Figures 1 and 2 of the drawing, the plate members 12 and 14 being of brass having dimensions of 11.75" x 6" x 1". Both wall members 10 and 11 were of stainless steel, porous over the entire area, measured 8.5" x 4.5" x 0.0625" and were welded around the edges into the recesses of the plate members 12 and 14. There were thirty-four transverse grooves 20 in each of the recesses and the grooves measured 3.75" long x 0.125" wide x 0.03125" deep. The spacing between the faces 16 and 17 of the porous wall members 10 and 11 was 0.036". The hot porous wall member 10 was maintained at a temperature of 300° F. by means of cartridge heaters inserted into holes 37 and the cold porous wall member 11 was maintained at a temperature of 175° F. by passing a cooling medium through coils 39. A mixture of equal volumes of cetane and monomethyl naphthalene was used as the liquid mixture to be subjected to thermal diffusion and introduced into the apparatus by way of inlet conduit 29. The degree of separation obtained was determined by measuring the difference between the refractive indices at 25° C. of the products withdrawn through the hot and cold porous wall members. In test No. 1 the hot wall products were withdrawn through outlet conduits 26 and 27, and the cold wall products were withdrawn through outlet conduits 22 and 24. In test No. 2 the hot and cold wall products were withdrawn through outlet conduits 27 and 24, respectively.

In the third test all conditions were the same except that the porous walls 10 and 11 were replaced by liquid-impermeable stainless steel walls of the same dimensions and the fractions were withdrawn from adjacent the hot and cold walls through the knife-edge ports and outlet conduits 30 and 36, respectively. The fourth test differed from the third only in that the separation chamber was used in the vertical position, the cetane-monomethyl naphthalene mixture being introduced at the lower end through conduit 29 and the knife-edge port associated therewith, the fraction accumulating adjacent the hot wall was withdrawn at the top of the column by way of the knife-edge port associated with the conduit 30, and the product accumulating adjacent the cold wall was withdrawn at the bottom through the knife-edge port associated with the conduit 34. In all the tests the hot and cold wall products were withdrawn at equal rates.

The results were as shown in the following table and illustrated in Figure 5 of the drawing:

| Test No. | Curve in Figure 5 | Feed Rate, ltrs./hr./sq. ft. | Separation, $n_D^{25} \times 10^4$ |
|---|---|---|---|
| 1 (Porous) | A | 0.2142<br>0.520<br>0.955<br>1.854<br>2.181<br>3.033 | 337<br>249<br>192<br>130<br>126<br>83 |
| 2 (Porous) | B | 0.755<br>1.855<br>3.855<br>9.14<br>15.76 | 182<br>120<br>87<br>34<br>18 |
| 3 (Non Porous) | C | 0.739<br>4.571<br>8.997 | 175<br>34<br>19 |
| 4 (Non-Porous) | D | 0.880<br>1.000<br>2.065<br>4.131 | 75<br>72<br>45<br>23 |

Comparison of the data obtained in these test runs and particularly of curves A, B, C and D in Figure 5 of the drawing demonstrates the remarkable superiority, at both high and low feed rates, in terms of liters per hour per square foot of separation chamber area, of the method and apparatus of the invention over methods and apparatus heretofore proposed. For practical purposes, curves A and B may be considered as one curve showing the characteristics of the preferred embodiment of the invention in which the separation chamber is substantially horizontal, the hot wall is above the cold wall, and in which both the hot and cold walls are porous.

It is to be expected that numerous modifications will readily occur to those skilled in the art upon reading this description. All such modifications are intended to be included within the scope of the invention as defined in the accompanying claims.

I claim:

1. Liquid thermal diffusion apparatus for separating a liquid mixture into dissimilar liquid fractions which comprises two wall members face to face, the opposed faces thereof being smooth and substantially equidistantly and closely spaced from one another to form a substantially uniformly narrow separation chamber, at least one of said wall members being heat-conductive and porous; means including a member in direct heat-transmitting relation to said porous wall member for relatively heating one of the wall members and cooling the other wall member to maintain a temperature gradient across the separation chamber; conduit means for liquid communicating directly with the separation chamber; and conduit means for liquid communicating with the separation chamber through a porous wall member.

2. Liquid thermal diffusion apparatus for separating a liquid mixture into dissimilar liquid fractions which comprises two wall members face to face, the opposed faces thereof being smooth and substantially equidistantly spaced up to about 0.5 inch apart to form a substantially uniformly narrow separation chamber, at least one of said wall members being heat-conductive and porous; means including a member in engagement with said porous wall member for relatively heating one of the wall members and cooling the other wall member to maintain a temperature gradient across the separation chamber; an inlet for introducing a liquid mixture into the separation chamber; and a plurality of outlets for withdrawing at least one dissimilar liquid fraction from the chamber through a porous wall member.

3. Liquid thermal diffusion apparatus for separating a liquid mixture into dissimilar liquid fractions which comprises two stationary and porous wall members face to face, the opposed faces thereof being smooth and substantially equidistantly spaced up to about 0.5 inch apart to form a substantially uniformly narrow separation chamber; means for relatively heating one of the wall members and cooling the other wall member to maintain a temperature gradient across the separation chamber; an inlet for introducing a liquid mixture into the separation chamber; and a plurality of outlets for withdrawing dissimilar liquid fractions from the chamber through the porous wall members.

4. Liquid thermal diffusion apparatus for separating a liquid mixture into dissimilar liquid fractions which comprises two wall members face to face, the opposed faces thereof having a given area and being smooth and substantially equidistantly spaced up to about 0.5 inch apart to form a substantially uniformly narrow separation chamber of substantially said given area, at least a substantial portion of the area of at least one of said wall members being heat-conductive and porous; means including a member in direct contact with said porous member for relatively heating one of the wall members and cooling the other wall member to maintain a temperature gradient across the separation chamber; an inlet for introducing a liquid mixture into the separation chamber; and a plurality of outlets for withdrawing at least one dissimilar liquid fraction from the chamber through a porous wall member.

5. Liquid thermal diffusion apparatus for separating a liquid mixture into dissimilar liquid fractions which comprises two plate members having spaced wall members in face to face relation, the opposed faces thereof having a given area and being smooth and substantially equidistantly spaced up to about 0.5 inch apart to form a substantially uniformly narrow separation chamber of substantially said given area, a major portion of the area of at least one of said wall members being heat-conductive and porous; means including a member in at least one of said plate members in direct heat-transmitting relation to a porous wall member for relatively heating one of the wall members and cooling the other wall member to maintain a temperature gradient across the separation chamber; an inlet for introducing a liquid mixture into the separation chamber; and a plurality of outlets in said plate members, at least one of said outlets being located in a plate member behind a porous wall member for withdrawing at least one dissimilar liquid fraction from the chamber through said porous wall member.

6. Liquid thermal diffusion apparatus for separating a liquid mixture into dissimilar liquid fractions which comprises two wall members face to face, the opposed faces thereof having a given area and being smooth and substantially equidistantly spaced up to about 0.5 inch apart to form a substantially uniformly narrow separation chamber of substantially said given area, substantially the entire area of at least one of said wall members being heat-conductive and porous; means including a member in direct heat-transmitting relation to a porous wall member for relatively heating one of the wall members and cooling the other wall member to maintain a temperature gradient across the separation chamber; an inlet for introducing a liquid mixture into the separation chamber; and a plurality of outlets for withdrawing at least one dissimilar liquid fraction from the chamber through a porous wall member.

7. Liquid thermal diffusion apparatus for separating a liquid mixture into dissimilar liquid fractions which comprises two wall members face to face, the opposed faces thereof having a given area and being smooth and substantially equidistantly spaced up to about 0.5 inch apart to form a substantially uniformly narrow separation chamber of substantially said given area, said wall members being porous over at least a substantial portion of said given area; means for relatively heating one of the wall members and cooling the other wall member to maintain a temperature gradient across the separation chamber; an inlet for introducing a liquid mixture into the separation chamber; and a plurality of outlets for withdrawing dissimilar liquid fractions from the chamber through the porous wall members.

8. Liquid thermal diffusion apparatus for separating a liquid mixture into dissimilar liquid fractions which comprises two wall members face to face, the opposed faces thereof having a given area and being smooth and substantially equidistantly spaced up to about 0.5 inch apart to form a substantially uniformly narrow separation chamber of substantially said given area, said wall members being porous over a major portion of said given area; means for relatively heating one of the wall members and cooling the other wall member to maintain a temperature gradient across the separation chamber; an inlet for introducing a liquid mixture into the separation chamber; and a plurality of outlets for withdrawing dissimilar liquid fractions from the chamber through the porous wall members.

9. Liquid thermal diffusion apparatus for separating a liquid mixture into dissimilar liquid fractions which comprises two wall members face to face, the opposed faces thereof having a given area and being smooth and substantially equidistantly spaced up to about 0.5 inch apart to form a substantially uniformly narrow separation chamber of substantially said given area, said wall members being porous over substantially said entire given area; means for relatively heating one of the wall members and cooling the other wall member to maintain a temperature gradient across the separation chamber; an inlet for introducing a liquid mixture into the separation chamber; and a plurality of outlets for withdrawing dissimilar liquid fractions from the chamber through the porous wall members.

10. Liquid thermal diffusion apparatus for separating a liquid mixture into dissimilar liquid fractions which comprises two horizontal upper and lower wall members face to face, the opposed faces thereof being smooth and substantially equidistantly spaced up to about 0.5 inch apart to form a substantially uniformly narrow and horizontal separation chamber, at least one of said wall members being heat-conductive and porous; means including a member in direct heat-transmitting relation to a porous wall member for relatively heating one of the wall members and cooling the other wall member to maintain a temperature gradient across the separation chamber; an outlet for introducing a liquid mixture into the separation chamber; and a plurality of outlets for withdrawing at least one dissimilar liquid fraction from the chamber through a porous wall member.

11. Liquid thermal diffusion apparatus for separating a liquid mixture into dissimilar liquid fractions which comprises two horizontal upper and lower wall members face to face, the opposed faces thereof being smooth and substantially equidistantly spaced up to about 0.5 inch apart to form a substantially uniformly narrow and horizontal separation chamber, at least one of said wall members being heat-conductive and porous; means including a member in direct heat-transmitting relation to a porous wall member for relatively heating the upper wall member and cooling the lower wall member to maintain a temperature gradient across the separation chamber; an inlet for introducing a liquid mixture into the separation chamber; and a plurality of outlets for withdrawing at least one dissimilar liquid fraction from the chamber through a porous wall member.

12. A method for separating dissimilar materials in a liquid mixture by liquid thermal diffusion which comprises forming a thin layer of the liquid mixture, imposing a temperature gradient across the layer from one face thereof to the other to stratify the layer into liquid strata at opposite sides thereof, said strata having outer faces of substantial area through which said temperature gradient is imposed, one of said strata being enriched in one of said materials, and withdrawing liquid laterally and simultaneously from the outer face of said one of said strata throughout the major portion of the area of the outer face thereof.

13. A method for separating dissimilar materials in a liquid mixture by continuous liquid thermal diffusion which comprises continuously forming a thin layer of the liquid mixture; imposing a temperature gradient across the layer from one face thereof to the other continuously to stratify the layer into opposite liquid strata at opposite sides thereof, said strata having outer faces of substantial area through which said temperature gradient is imposed, one of said liquid strata being enriched in one of said dissimilar materials and the opposite liquid stratum being impoverished in said one of said dissimilar materials; and continuously withdrawing liquid laterally from the outer face of said one of said strata, said liquid being withdrawn substantially simultaneously throughout the major portion of the area of the outer face of said one of said strata.

14. A method for separating dissimilar materials in a liquid mixture by continuous liquid thermal diffusion which comprises continuously forming a thin horizontal layer of the liquid mixture; imposing a temperature gradient across the layer from one face thereof to the other continuously to stratify the layer into opposite liquid strata at the top and bottom thereof, said strata having outer faces of substantial area through which said temperature gradient is imposed, one of said liquid strata being enriched in one of said dissimilar materials and the opposite liquid stratum being impoverished in said one of said dissimilar materials; and continuously withdrawing liquid upwardly from the top stratum and downwardly from the bottom stratum, said liquid being withdrawn substantially simultaneously throughout the major portion of the areas of the outer faces of said top and bottom strata.

15. A method for separating dissimilar materials in a liquid mixture by continuous liquid thermal diffusion which comprises continuously forming a thin horizontal and advancing layer of the liquid mixture; imposing a higher temperature on the upper face of the advancing layer than on the other continuously to stratify the layer into opposite and concurrently advancing top and bottom liquid strata, said strata having outer faces of substantial area through which said temperature gradient is imposed, one of said liquid strata being enriched in one of said dissimilar materials and the opposite liquid stratum being impoverished in said one of said dissimilar materials; and continuously withdrawing liquid from the top and bottom strata, said liquid being withdrawn substantially uniformly throughout the major portion of the areas of the outer faces of said top and bottom strata.

References Cited in the file of this patent

UNITED STATES PATENTS

| | | |
|---|---|---|
| 2,158,238 | Hvid | May 16, 1939 |
| 2,521,112 | Beams | Sept. 5, 1950 |
| 2,541,071 | Jones et al. | Feb. 13, 1951 |
| 2,567,765 | Debye | Sept. 11, 1951 |
| 2,584,785 | Bowman et al. | Feb. 5, 1952 |
| 2,585,244 | Hanson | Feb. 12, 1952 |
| 2,609,059 | Benedict | Sept. 2, 1952 |